Patented May 20, 1941

2,242,236

UNITED STATES PATENT OFFICE 2,242,236

DI-AMINO-ALKYL-DISULPHOXIDES AND PROCESS FOR MAKING THEM

Walter G. Christiansen, Glen Ridge, N. J., and Morris A. Dolliver, Jackson Heights, N. Y., assignors to E. R. Squibb & Sons, New York, N. Y., a corporation of New York No Drawing. Application June 29, 1939, Serial No. 281,902

11 Claims. (Cl. 260—583)

This invention relates to, and has for its object the provision of, compounds of the general formula

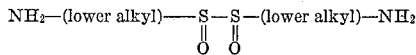

—especially compounds of the general formula

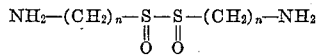

wherein $n$ represents an integer from 1 to 4 inclusive—acid-addition salts thereof, and a process of preparing them.

These compounds are promising therapeutic agents. They may be prepared from the acid-addition salts of the corresponding disulphides, e. g. from bis-($\beta$-amino-ethyl)-disulphide dihydrochloride, by oxidation thereof with hydrogen peroxide; and the resulting salt, e. g. bis-($\beta$-amino-ethyl)-disulphoxide dihydrochloride, may be converted to the corresponding mono-hydrochloride or free base in the usual manner, e. g. by careful neutralization of an aqueous solution thereof with a base such as NaOH. Obviously acid-addition salts other than the hydrochloride may be used to obtain the corresponding acid-addition salt of the disulphoxide, inter alia the borate, nitrate, lactate, sulphate and picrate.

The following examples are illustrative of the invention:

Example 1

A solution of 2.28 g. hydrogen peroxide (30%) in 9.2 cc. water is added to 2.25 g. bis-($\beta$-amino-ethyl)-disulphide dihydrochloride, the mixture is allowed to stand at room temperature for 22 hours, and then concentrated to a syrup by evaporation under reduced pressure at room temperature; the syrup is then taken up in warm glacial acetic acid, and enough water added to effect solution; on chilling, the product, bis-($\beta$-amino-ethyl)-disulphoxide dihydrochloride, separates in crystalline form, the yield being 1.7 g.

The product is a white crystalline compound melting with decomposition at 166° C. (uncorrected); it is very soluble in water, soluble in dilute ethanol, methanol and acetic acid, and difficultly soluble—if at all—in absolute ethanol, absolute methanol, chloroform, benzene, ethyl ether, petroleum ether and ethyl acetate. The compound oxidizes potassium iodide at room temperature in acid solution to free iodine; it consumes iodine from solution slowly at room temperature and more rapidly at higher temperatures (50–75° C.); and it decolorizes methylene blue solutions when exposed to sunlight.

Example 2

Bis-($\beta$-amino-propyl)-disulphide dihydrochloride is converted into bis-($\beta$-amino-propyl)-disulphoxide dihydrochloride by treatment with hydrogen peroxide in the manner detailed in Example 1.

Example 3

Bis-(gamma-amino-propyl)-disulphide dihydrochloride—prepared from gamma-amino-propyl-mercaptan by bubbling gaseous oxygen through an aqueous solution thereof, treating with alcoholic HCl, concentrating in vacuo, and precipitating the desired compound with 95% or absolute ethanol—is converted into bis-(gamma-amino-propyl)-disulphoxide dihydrochloride by treatment with hydrogen peroxide in the manner detailed in Example 1.

The invention may be variously otherwise embodied within the scope of the appended claims.

What is claimed:

1. A disulphoxide of the group consisting of compounds of the general formula

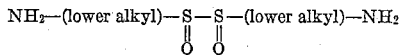

and acid-addition salts thereof.

2. An acid-addition salt of a compound of the general formula

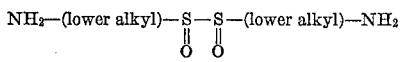

3. An acid-addition salt of a compound of the general formula

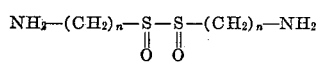

wherein $n$ represents an integer from 1 to 4 inclusive.

4. A hydrochloride of a compound of the general formula

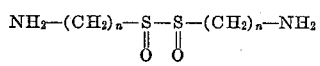

wherein $n$ represents an integer from 1 to 4 inclusive.

5. Bis-($\beta$-amino-ethyl)-disulphoxide dihydrochloride.

6. Bis-($\beta$-amino-propyl)-disulphoxide dihydrochloride.

7. Bis-(gamma-amino-propyl)-disulphoxide dihydrochloride.

8. The process of preparing disulphoxides which comprises reacting an acid-addition salt of a compound of the general formula $NH_2$—(lower alkyl)—S—S—(lower alkyl)—NH₂ with H₂O₂.

9. The process of preparing disulphoxides which comprises treating an acid-addition salt of a compound of the general formula NH₂—(lower alkyl)—S—S—(lower alkyl)—NH₂ with an aqueous solution of hydrogen peroxide.

10. The process of preparing disulphoxides which comprises treating an acid-addition salt of a compound of the general formula $$NH_2-(CH_2)_n-S-S-(CH_2)_n-NH_2$$

wherein $n$ represents an integer from 1 to 4 inclusive, with an aqueous solution of hydrogen peroxide.

11. The process of preparing bis-(β-amino-ethyl)-disulphoxide dihydrochloride which comprises reacting bis-(β-amino-ethyl)-disulphide dihydrochloride with H₂O₂.

WALTER G. CHRISTIANSEN.
MORRIS A. DOLLIVER.